US006517286B1

(12) United States Patent
Latchem

(10) Patent No.: US 6,517,286 B1
(45) Date of Patent: Feb. 11, 2003

(54) METHOD FOR HANDLING LIQUIFIED NATURAL GAS (LNG)

(75) Inventor: Raymond R. Latchem, Wasilla, AK (US)

(73) Assignee: Spectrum Energy Services, LLC, Anchorage, AK (US)

( * ) Notice: Subject to any disclaimer, the term of this patent is extended or adjusted under 35 U.S.C. 154(b) by 0 days.

(21) Appl. No.: 09/777,615

(22) Filed: Feb. 6, 2001

(51) Int. Cl.[7] .......................... E21B 43/00; B65G 5/00; F17C 7/04

(52) U.S. Cl. ............................ 405/53; 405/52; 405/59; 166/50; 166/335; 166/366; 62/50.2; 62/53.1

(58) Field of Search ............................ 405/52, 53, 55, 405/59; 166/335, 351, 352, 366, 368, 77.1, 50; 299/4–6, 17; 62/50.1, 50.2, 53.1

(56) References Cited

U.S. PATENT DOCUMENTS

| | | | | |
|---|---|---|---|---|
| 1,921,358 A | | 8/1933 | Hill et al. | |
| 2,459,227 A | | 1/1949 | Kerr | |
| 2,550,844 A | | 5/1951 | Meiller et al. | |
| 2,590,066 A | | 3/1952 | Pattinson | |
| 2,803,114 A | | 8/1957 | Hudson | |
| 2,810,263 A | | 10/1957 | Raymond | |
| 3,022,822 A | | 2/1962 | McStravick et al. | |
| 3,742,716 A | * | 7/1973 | Backstrom | 405/57 |
| 3,848,427 A | * | 11/1974 | Loofbourow | 405/53 X |
| 5,129,759 A | * | 7/1992 | Bishop | 405/59 |
| 5,154,741 A | | 10/1992 | da Costa Filho | |
| 5,431,482 A | * | 7/1995 | Russo | 299/4 |
| 5,511,905 A | * | 4/1996 | Bishop et al. | 405/59 |
| 5,669,734 A | * | 9/1997 | Bechnel, Jr. et al. | 405/55 X |
| 6,003,603 A | * | 12/1999 | Breivik et al. | 166/367 |
| 6,019,174 A | * | 2/2000 | Korsgaard | 166/352 |
| 6,230,809 B1 | * | 5/2001 | Korsgaard | 166/352 |
| 6,298,671 B1 | * | 10/2001 | Kennelley et al. | 62/50.2 |

FOREIGN PATENT DOCUMENTS

| | | | | |
|---|---|---|---|---|
| FR | 2640945 | * | 6/1990 | 405/53 |
| JP | 57086698 | * | 5/1982 | 62/53.1 |
| JP | 57090301 | * | 6/1982 | 405/53 |

* cited by examiner

*Primary Examiner*—Jong-Suk (James) Lee
(74) *Attorney, Agent, or Firm*—Fellers, Snider, Blankenship, Bailey & Tippens, P.C.

(57) ABSTRACT

A system for handling liquified natural gas (LNG) wherein (a) the LNG is delivered into a subterranean formation such that the LNG absorbs heat energy from the subterranean formation and is thereby converted to a gas product and (b) the gas is then produced from the subterranean formation. The subterranean formation is preferably a depleted offshore gas formation having an offshore production platform which is modified to receive LNG from marine transport vessels which are unloaded at an offshore receiving station.

18 Claims, 1 Drawing Sheet

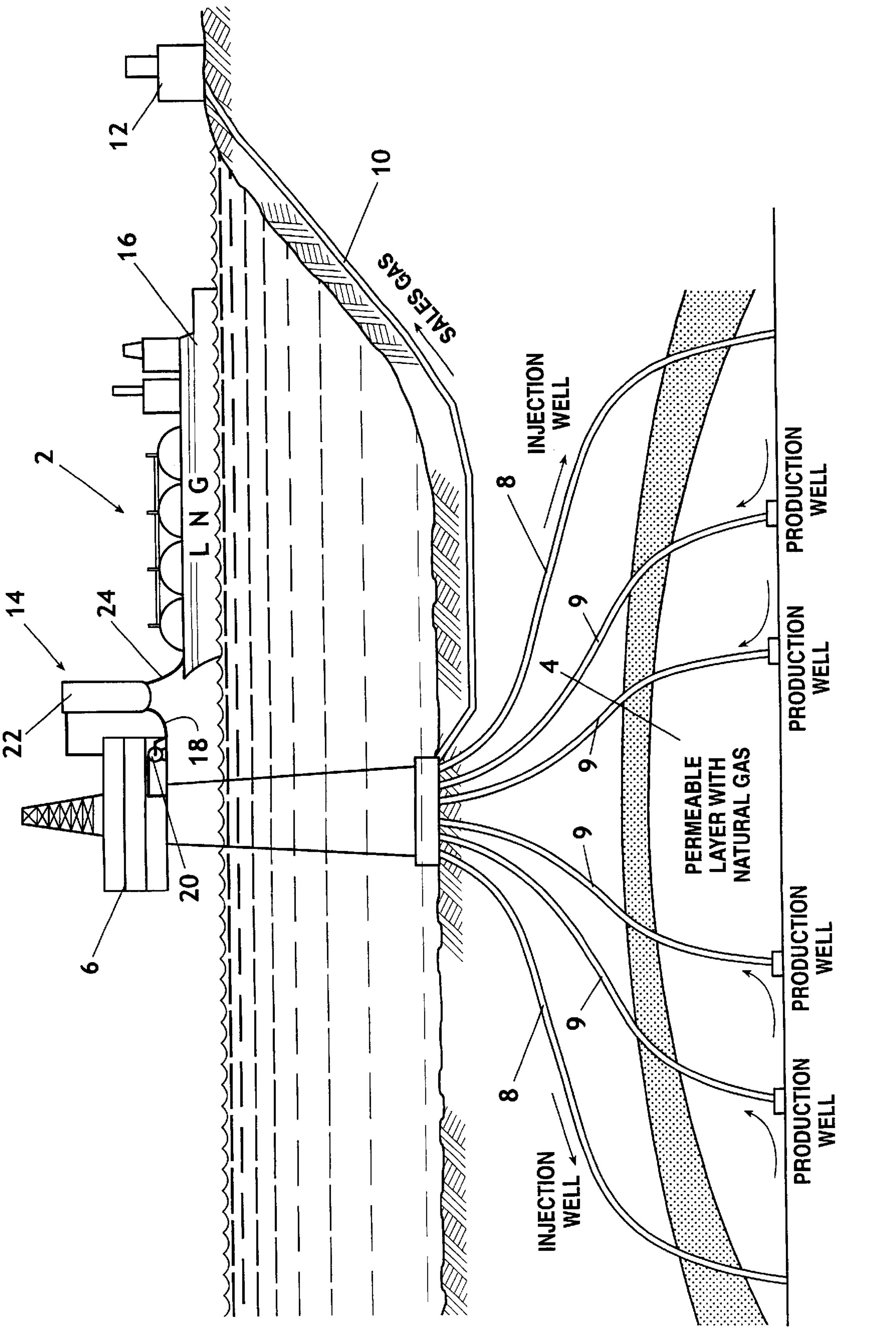
12
10
16
SALES GAS
2
L N G
14
24
22
18
20
6
INJECTION WELL
8
9
4
PERMEABLE LAYER WITH NATURAL GAS
PRODUCTION WELL
PRODUCTION WELL
PRODUCTION WELL
PRODUCTION WELL
9
9
9
8
INJECTION WELL

METHOD FOR HANDLING LIQUIFIED NATURAL GAS (LNG)

FIELD OF THE INVENTION

The present invention relates to systems for importing, storing, and vaporizing liquified natural gas (LNG).

BACKGROUND OF THE INVENTION

There currently exist only about four import terminal facilities in the United States for receiving LNG. At these facilities, the LNG is unloaded from LNG tankers and stored in land-based, insulated tanks. From these tanks the LNG is typically pumped through a heated vaporizing system for delivery as a gas to a gas pipeline distribution system.

Natural gas prices are currently increasing rapidly due to inability to meet demand. Unfortunately, the LNG import terminals existing in the United States are presently operating at capacity. New import terminals of the type currently used in the United States cost hundreds of millions of dollars to build. Moreover, it is very difficult and expensive to find and acquire permissible sites for such facilities. Besides the space needed for the import tanks, pumps, vaporizers, etc., large impoundment safety areas must also be provided around all above-ground LNG storage and handling vessels and equipment. LNG import facilities also consume large amounts of fuel gas and/or electrical energy for pumping the LNG from storage and vaporizing the material for delivery to gas distribution systems.

Thus, a need presently exists for LNG import, storage, vaporization, and delivery systems which are more energy efficient and are less difficult and expensive to site and build. In view of the urgent need for additional import capacity in the United States, the new import, storage and delivery facilities will also preferably be able to be placed in operation very quickly.

SUMMARY OF THE INVENTION

The present invention satisfies the needs and alleviates the problems discussed hereinabove. The inventive system can generally be used for receiving, storing, vaporizing, and delivering LNG from any source. The inventive system is particularly well-suited for receiving LNG from tankers, ships, or any other types of marine transport vessels.

In one aspect, the present invention provides a method of handling liquified natural gas (LNG) comprising the steps of: (a) delivering the LNG in a liquid state into a subterranean formation such that the LNG absorbs heat energy from the subterranean formation which converts the LNG to a gas product in the subterranean formation and (b) producing the gas product from the subterranean formation.

The subterranean formation will preferably be a gas formation which has been substantially depleted. The conversion of the LNG to gas in the subterranean formation will preferably increase the formation pressure sufficiently at least for producing the gas from the formation. Once produced from the formation, the gas will preferably be conducted to a desired delivery point. Examples of typical delivery points could include, but are not limited to, gas pipeline systems or gas-burning facilities.

In another aspect, the present invention provides a method of handling LNG comprising the steps of (a) unloading the LNG from a marine transport vessel at an offshore receiving station and (b) delivering the LNG into an offshore subterranean formation such that the LNG absorbs heat energy from the formation which converts the LNG to a gas product. The offshore subterranean formation will preferably have at least one well extending into the formation via which the LNG is delivered in step (b). The method preferably further comprises the steps of: (c) producing the gas product from the offshore formation; and (d) conducting the gas product to a land-based receiving point. The conversion of the LNG to gas in step (b) will preferably increase the pressure of the offshore subterranean gas formation such that the formation pressure is sufficient at least for producing the gas from the formation.

In yet another aspect, the present invention provides an apparatus for handling LNG. The inventive apparatus preferably comprises: an offshore receiving station for receiving LNG from a marine transport vessel; an offshore gas production platform for producing gas from a subterranean gas formation, the subterranean gas formation having at least one well extending thereinto; means for delivering the LNG received from the marine transport vessel into the well; and means for conducting gas from the offshore subterranean gas formation to a land-based receiving point.

Further objects, features and advantages of the present invention will be apparent to those skilled in the art upon examining the accompanying drawings and upon reading the following description of the preferred embodiments.

BRIEF DESCRIPTION OF THE DRAWING

The drawing schematically illustrates an embodiment 2 of an offshore handling system provided by the present invention.

DETAILED DESCRIPTION OF THE PREFERRED EMBODIMENTS

The inventive system can receive LNG from substantially any source and can utilize substantially any subterranean formation capable of containing and transferring geothermal energy to the LNG material. For example, in one alternative to the embodiment depicted in the Drawing, the subterranean formation could be either a land-based or an offshore formation located near an existing LNG import terminal. In such case, the inventive system could optionally use the tanker unloading facilities already existing at the terminal and would significantly supplement the terminal's storage and vaporization capacity.

The subterranean formation used in the inventive system will preferably be an existing gas formation and/or will preferably be a formation which has been at least substantially depleted. The subterranean formation will most preferably be an existing offshore gas formation.

The Drawing illustrates a particularly preferred embodiment 2 of the inventive system. Inventive system 2 preferably utilizes an existing offshore gas formation 4 equipped with: an offshore gas production platform 6; at least one well (preferably a plurality of wells) 8 and/or 9 extending into formation 4; and a gas production/sales line or other conduit 10 extending from production platform 6 to a land-based receiving point 12.

Land-based receiving point 12 can be any type of onshore gas distribution or gas using facility. The land-based receiving point 12 will typically be a gas pipeline distribution system.

In the inventive system, LNGA in a liquid state will preferably be pumped into the offshore formation 4 via one or more of wells 8. As the LNG flows into and floods formation 4, the LNG absorbs geothermal energy from formation 4 such that the LNG vaporizes and the pressure within formation 4 increases. The resulting vaporized gas product can be held and stored in formation 4 until needed. In addition, the vaporization of the LNG will preferably at least provide sufficient pressure in formation 4 for producing the gas from formation 4 via one or more of the wells 8 and/or 9. The increased formation pressure can in some cases be sufficient for delivering the gas to land-based receiving point 12 via sales line 10. However, if necessary, one or more compressors or other pumping systems can be installed on-shore and/or on the offshore platform 6 for boosting the flow of gas to receiving point 12.

Offshore platform 6, wells 8 and 9, and sales line 10 will preferably be existing structures which were previously used for producing and delivering natural formation gas from offshore formation 4. The metallurgy of the casing or pipe in the particular existing well(s) 8 selected for use in injecting the LNG into formation 4 may need to be upgraded for handling cryogenic fluid. In addition, these well(s) 8 can optionally be fractured, if desired, in order to increase the rate at which the LNG can be pumped into formation 4, thus expediting the unloading of LNG vessels 16.

The inventive system 2 will preferably include a plurality of wells 8 and 9 so that one or more wells 8 can be used for delivering LNG into formation 4 and one or more other wells 9 can be used for producing the vaporized gas product from the formation. In such cases, only those wells 8 which are used for delivering the LNG into formation 4 will typically require any modification. As will be understood by those skilled in the art, existing offshore units used for producing natural gas can, in some cases, include as many as two dozen or more wells 8 and 9.

The wells 8 used for LNG injection and the wells 9 used for gas production will preferably be selected to optimize flow and heat transfer throughout formation 4. For example, the LNG could be injected via a plurality of outer wells 8 with the gas product being withdrawn via one or more centrally located wells 9, or vice versa. Alternatively, all of the material could be caused to flow across the entire formation 4 by injecting LNG into one end or side of the formation and recovering the gas product from the opposite end or side thereof.

Inventive system 2 also preferably comprises: an offshore receiving station 14 for unloading and receiving LNG from a tanker, ship, or any other marine transport vessel 16; one or more pipes or other conduits 18 for delivering the LNG from offshore receiving station 14 to well(s) 8; and, if needed, one or more pumps 20, preferably positioned on platform 6, for pumping the LNG into wells 8.

Offshore receiving station 14 can be any type of facility or system used for unloading LNG from transport vessels. By way of example, but not by way of limitation, receiving station 14 can comprise a boom 22 as depicted in the drawing (preferably a pivotable and/or retractable boom) provided on offshore platform 6 and having one or more cryogenic hoses 24 which can be extended from boom 22 to vessel 16. Alternatively, a typical swivel jointed pipe system (e.g., a Chicsan arm) could be extended from platform 6 to vessel 16. As will be appreciated by those skilled in the art, systems such as these will readily accommodate changing tides and unsteady seas.

As will also be understood by those skilled in the art, typical LNG vessels 16 will be equipped with pumps sufficient for offloading their cargo into the receiving system. Depending upon the particular well(s) 8 and formation 4 in question, the pumps on vessels 16 might also be sufficient for pumping the LNG into the formation.

The present invention thus provides a low cost, highly energy efficient system for importing, storing, delivering, and vaporizing LNG. The inventive system can also be located and built very quickly and at costs which are much lower than those of current types of LNG import facilities, particularly when offshore formations already having existing production platforms, wells, and other production and delivery equipment are used.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of handling liquified natural gas, LNG, comprising the steps of:

(a) delivering said LNG in a liquid state into a subterranean gas formation which has been at least substantially depleted such that said LNG absorbs an effective amount of heat energy from said subterranean gas formation to vaporize said LNG in said subterranean gas formation to produce a gas product in said subterranean gas formation and (b) producing said gas product from said subterranean gas formation.

2. The method of claim 1 wherein said subterranean gas formation has a formation pressure and the vaporization of said LNG in said subterranean gas formation in step (a) to produce said gas product increases said formation pressure such that said formation pressure is sufficient for producing said gas product from said subterranean gas formation in step (b).

3. The method of claim 1 wherein said subterranean gas formation is an offshore formation.

4. The method of claim 3 further comprising the step of (c) conducting said gas product produced from said offshore formation in step (b) to a land-based delivery point.

5. The method of claim 3 further comprising the step, prior to step (a), of delivering said LNG from an offshore receiving station to said offshore formation.

6. The method of claim 5 further comprising the step, prior to said step of delivering said LNG from said offshore receiving station, of unloading said LNG from a marine transport vessel at said offshore receiving station.

7. The method of claim 3 wherein said offshore formation has at least a first well extending thereinto and said LNG is delivered in said liquid state into said offshore formation in step (a) via said first well.

8. The method of claim 7 wherein said offshore formation has a second well extending thereinto and said gas product is produced from said offshore formation in step (b)via said second well.

9. The method of claim 8 wherein:

said first well and said second well are at different locations in said offshore formation;

said LNG flows through said offshore formation from said fist well to said second well; and said effective amount of heat energy is absorbed by said LNG from said offshore formation as said LNG flows from said first well to said second well.

10. The method of claim 3 wherein said offshore formation has conduit means extending therefrom to a land-based gas pipeline system and said method further comprises the step of delivering said gas product produced in step (b) to said gas pipeline system via said conduit means.

11. The method of claim 10 wherein:

said offshore formation has a formation pressure and the vaporization of said LNG in said offshore formation in step (a) to produce said gas product increases said formation pressure such that said formation pressure is sufficient to deliver said gas product, without assistance, from said offshore formation to said gas pipeline system.

12. The method of claim 1 wherein:

said LNG is delivered in said liquid state into said subterranean gas formation in step (a) via a first well;

said gas product is produced from said subterranean gas formation in step (b) via a second well;

said first well and said second well are at different locations in said subterranean gas formation;

said LNG flows through said subterranean gas formation from said first well to said second well; and said effective amount of heat energy is absorbed by said LNG from said subterranean gas formation as said LNG flows from said first well to said second well.

13. The method of claim 1 wherein:

said subterranean gas formation has at least one central well in communication therewith;

said subterranean gas formation has a plurality of outer wells in communication therewith at locations spaced apart from said central well;

said LNG is delivered in said liquid state into said subterranean gas formation in step (a) via said outer wells;

said gas product is produced from said subterranean gas formation in step (b) via said central well;

said LNG flows through said subterranean gas formation from said outer wells to said central well; and said effective amount of heat energy is absorbed by said LNG from said subterranean gas formation as said LNG flows from said outer wells to said central well.

14. The method of claim 1 wherein:

said subterranean gas formation has at least one central well in communication therewith;

said subterranean gas formation has a plurality of outer wells in communication therewith at locations spaced apart from said central well;

said LNG is delivered in said liquid state into said subterranean gas formation in step (a) via said central well;

said gas product is produced from said subterranean gas formation in step (b) via said outer wells;

said LNG flows through said subterranean gas formation from said central well to said outer wells; and said effective amount of heat energy is absorbed by said LNG from said subterranean gas formation as said LNG flows from said central well to said outer wells.

15. A method of handling liquified natural gas, LNG, comprising the steps of:

(a) unloading said LNG from a marine transport vessel at an offshore receiving station;

(b) delivering said LNG in a liquid state into an offshore subterranean gas formation such that said LNG absorbs an effective amount of heat energy from said offshore subterranean gas formation to vaporize said LNG in said offshore subterranean gas formation to produce a gas product in said offshore subterranean gas formation, said offshore subterranean gas formation having an offshore gas production platform and at least one well extending into said offshore subterranean gas formation, said LNG being delivered into said offshore subterranean gas formation in said liquid state in step (b) via said well;

(c) producing said gas product from said offshore subterranean gas formation; and (d) conducting said gas product to a land-based receiving point.

16. The method of claim 15 wherein said receiving point is a gas pipeline system.

17. The method of claim 15 wherein:

said offshore subterranean gas formation has a formation pressure and the vaporization of said LNG in said offshore subterranean gas formation in step (b) to produce said gas product increases said formation pressure such that said formation pressure is sufficient for producing said gas product from said offshore subterranean gas formation in step (c).

18. The method of claim 15 wherein:

said well is a first well;

said gas product is produced from said offshore subterranean gas formation in step (c) via a second well at a different location in said offshore subterranean gas formation from said first well;

said LNG flows through said offshore subterranean gas formation from said first well to said second well; and said effective amount of heat energy is absorbed by said LNG from said offshore subterranean gas formation as said LNG flows from said first well to said second well.

* * * * *